(12) United States Patent
Stenvik

(10) Patent No.: US 11,490,625 B2
(45) Date of Patent: Nov. 8, 2022

(54) METHOD AND APPARATUS FOR MAKING CO-EXTRUDED FOOD PRODUCT

(71) Applicant: General Mills, Inc., Minneapolis, MN (US)

(72) Inventor: Ralph A Stenvik, Plymouth, MN (US)

(73) Assignee: General Mills, Inc., Minneapolis, MN (US)

(*) Notice: Subject to any disclaimer, the term of this patent is extended or adjusted under 35 U.S.C. 154(b) by 773 days.

(21) Appl. No.: 14/575,686

(22) Filed: Dec. 18, 2014

(65) Prior Publication Data
US 2016/0174580 A1 Jun. 23, 2016

(51) Int. Cl.
| | | |
|---|---|---|
| *A21C 15/00* | (2006.01) | |
| *A23L 7/126* | (2016.01) | |
| *A23P 30/25* | (2016.01) | |
| *A23P 20/20* | (2016.01) | |
| *A21D 13/80* | (2017.01) | |
| *A21D 13/37* | (2017.01) | |
| *A21D 13/32* | (2017.01) | |
| *A23P 10/25* | (2016.01) | |
| *A23P 10/00* | (2016.01) | |

(Continued)

(52) U.S. Cl.
CPC ............ *A21C 15/007* (2013.01); *A21D 13/32* (2017.01); *A21D 13/37* (2017.01); *A21D 13/80* (2017.01); *A23G 3/0021* (2013.01); *A23G 3/0023* (2013.01); *A23G 3/0068* (2013.01); *A23G 3/2015* (2013.01); *A23L 7/126* (2016.08); *A23P 10/00* (2016.08); *A23P 10/25* (2016.08); *A23P 20/20* (2016.08); *A23P 30/25* (2016.08)

(58) Field of Classification Search
USPC ......................................................... 426/279
See application file for complete search history.

(56) References Cited

U.S. PATENT DOCUMENTS

| | | |
|---|---|---|
| D161,423 S | 1/1951 | Claflin |
| D271,534 S | 11/1983 | Huzinec |

(Continued)

FOREIGN PATENT DOCUMENTS

| | | |
|---|---|---|
| EP | 1036501 | 9/2000 |
| WO | WO 2011/0104564 | 9/2011 |

OTHER PUBLICATIONS

Embedded, (n.d.). Cambridge Dictionary, Retrieved Oct. 18, 2017, http://dictionary.cambridge.org/us/dictionary/english/embedded, pp. 1-6.*

(Continued)

*Primary Examiner* — Nikki H. Dees
(74) *Attorney, Agent, or Firm* — Diederiks & Whitelaw, PLC; Annette M. Frawley, Esq.

(57) ABSTRACT

A snack bar is produced in accordance with a method employing an extrusion apparatus to include a base or crust, a primary filling provided on the base and a second filling or topping embedded in, yet externally exposed from, the primary filling. The primary and secondary fillings are co-extruded, with an extrusion nozzle for the secondary filling being located directly adjacent an extrusion port for the primary filling. The primary filling is non-flowable, while the secondary filling is preferably flowable. The extrusion nozzle can be repositioned either between or during extrusion operations to alter a repeating pattern for the secondary filling.

13 Claims, 5 Drawing Sheets

(51) Int. Cl.
*A23G 3/34* (2006.01)
*A23G 3/20* (2006.01)

(56) References Cited

U.S. PATENT DOCUMENTS

| | | | |
|---|---|---|---|
| 5,019,404 A * | 5/1991 | Meisner | A23G 3/2015 264/40.7 |
| D360,969 S | 8/1995 | Uecker et al. | |
| D366,672 S | 1/1996 | Kitzmiller | |
| 5,538,742 A * | 7/1996 | McHale | A23G 4/043 425/130 |
| 5,686,128 A | 11/1997 | Tracy et al. | |
| D427,746 S | 7/2000 | Cox | |
| D428,682 S | 8/2000 | Rapaport | |
| D432,756 S | 10/2000 | Rapaport | |
| 6,299,916 B1 | 10/2001 | Dally et al. | |
| D532,182 S | 11/2006 | Hopkins et al. | |
| D546,679 S | 7/2007 | El-Afandi | |
| 7,264,836 B2 | 9/2007 | McHugh et al. | |
| 7,407,683 B2 | 8/2008 | Jones | |
| D604,927 S | 12/2009 | Kubantseva et al. | |
| D613,029 S | 4/2010 | Krumholz et al. | |
| D619,454 S | 7/2010 | Fluegel et al. | |
| 7,771,182 B2 * | 8/2010 | Fornaguera | A23G 1/54 425/133.1 |
| D661,866 S | 6/2012 | Asakura | |
| D703,917 S | 5/2014 | Rodgers et al. | |
| 2001/0002267 A1 | 5/2001 | Rapaport | |
| 2003/0129281 A1 * | 7/2003 | Murray | A23C 19/0908 426/92 |
| 2004/0185158 A1 | 9/2004 | McHugh et al. | |
| 2004/0241313 A1 | 12/2004 | Nana et al. | |
| 2004/0258820 A1 * | 12/2004 | Thomas | A21C 11/163 426/516 |
| 2007/0160707 A1 * | 7/2007 | Garcia | A23G 3/0068 426/3 |
| 2009/0110780 A1 | 4/2009 | Sanchez et al. | |
| 2010/0055274 A1 * | 3/2010 | Weinstein | A21C 11/163 426/392 |
| 2011/0033577 A1 | 2/2011 | Molchan et al. | |
| 2014/0363543 A1 | 12/2014 | Ball et al. | |

OTHER PUBLICATIONS

Embedded. [Def. 1] (n.d.). Cambridge Dictionary, Retrieved Oct. 10, 2017, http://dictionary.cambridge.org/us/dictionary/english/embedded, pp. 1-6.*

Embed, (n.d.). Mnemonic Dictionary, Retrieved Oct. 18, 2017, http://www.mnemonicdictionary.com/?word=embed, p. 1.*

Candiquik, "*Vanilla Biscoff Swirl Fudge*", Miss Candiquik, Nov. 29, 2012. Web. Mar. 28, 2016 <http://blog.candiquik.com/vanilla-biscoff-swirl-fudge/>.

* cited by examiner

METHOD AND APPARATUS FOR MAKING CO-EXTRUDED FOOD PRODUCT

BACKGROUND OF THE INVENTION

The invention generally pertains to the art of food and, more particularly, to a method and apparatus for manufacturing a food product including a combination filling material having a main body portion formed from a primary, non-flowable food filling and a secondary food filling, such as a flowable topping, which is embedded in, yet exposed exteriorly of, the primary food filling, wherein both the primary and secondary food fillings are co-extruded, preferably upon a base or crust.

Lifestyle choices have resulted in many people relying on snack products to satisfy breakfast, between meal and even dessert needs. For instance, pastries are common snack products which fulfill some of these needs. In the case of pastries including a filling material, the filling material is layered directly on a dough or other base. In certain products, a secondary filling can also be employed, such as in the form of a layer of icing or other topping.

In any event, to satisfy market demand, a wide range of filling-based snack products have been developed and made available for sale. Regardless of the available snack products, it would still be advantageous to be able to produce additional snack products which include multiple filling materials, particularly multiple filling snack products which can be effectively and efficiently produced through a co-extrusion process.

SUMMARY OF THE INVENTION

In accordance with one aspect of the invention, a snack product is produced to include a base or crust, a primary filling material which is non-flowable, and a secondary filling or topping material which is flowable and embedded within, yet externally exposed from, the primary filling material. In one form of the invention, the primary filling material is a cheesecake filling, while the secondary filling material is a fruit filling. In any case, the primary and secondary fillings are co-extruded, either separate from or with the base.

In particular, the invention is directed to creating a snack product including a base upon which is co-extruded a combined primary and secondary filling. Since the secondary filling is to be embedded within, yet externally exposed from the primary filling, care must be taken to assure that the secondary filling is not enveloped or encompassed by the primary filling. This object of the invention is achieved, at least in part, by specific relative positioning of an extrusion nozzle for the secondary filling material relative to an extrusion port for the primary filling material, while also balancing relative flow pressures for the different filling materials. In addition, in at least one form of the invention, it is desired to provide the secondary filling in a specified, non-linear pattern along a length of the primary filling. This object of the invention is achieved by oscillating or otherwise shifting the extrusion nozzle of the secondary filling relative to the extrusion port for the primary filling. After being constructed, the food product is cut to desired lengths, such as to form snack bars which can be separately packaged for sale.

Additional objects, features and advantages of the invention will become more readily apparent from the following detailed description when taken in conjunction with the drawings wherein like reference numerals refer to corresponding parts in the several views.

DETAILED DESCRIPTION OF THE INVENTION

Figure 1:
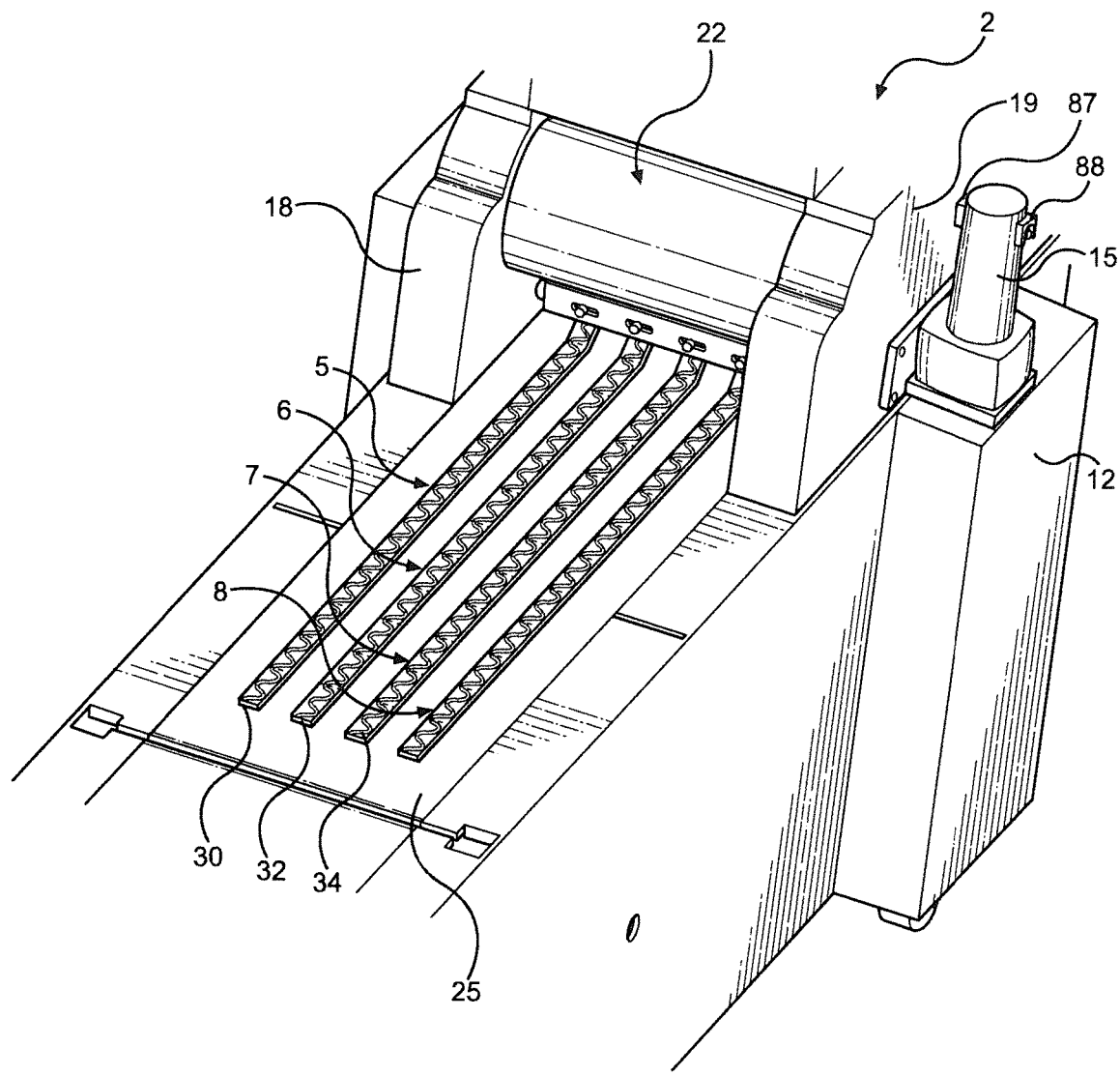
FIG. 1 is a perspective view of a combination extrusion and conveying apparatus employed in making a snack bar in accordance with the invention.

With reference to FIG. 1, an extrusion system constructed in accordance with the invention is generally indicated at 2. Extrusion system 2 can be employed to produce a wide range of food products, including rows of elongated, layered snack products such as indicated at 5-8. In general, extrusion system 2 is shown to include an outer housing 12 from which extends a control tower 15, upstanding supports 18 and 19 between which is supported an extruder 22, and a conveyor 25 upon which the snack products 5-8 are formed and transported. A particular snack product 5-8, made in accordance with the present invention, includes a base 30, a primary filling 32 and a secondary filling or topping 34. As will be detailed more fully below, each of the base 30, primary filling 32 and secondary filling 34 are formed through an extrusion process and, particularly important in connection with the invention, the primary and secondary fillings 32 and 34 are co-extruded, with secondary filling 34 being embedded within primary filling 32.

Figure 2:
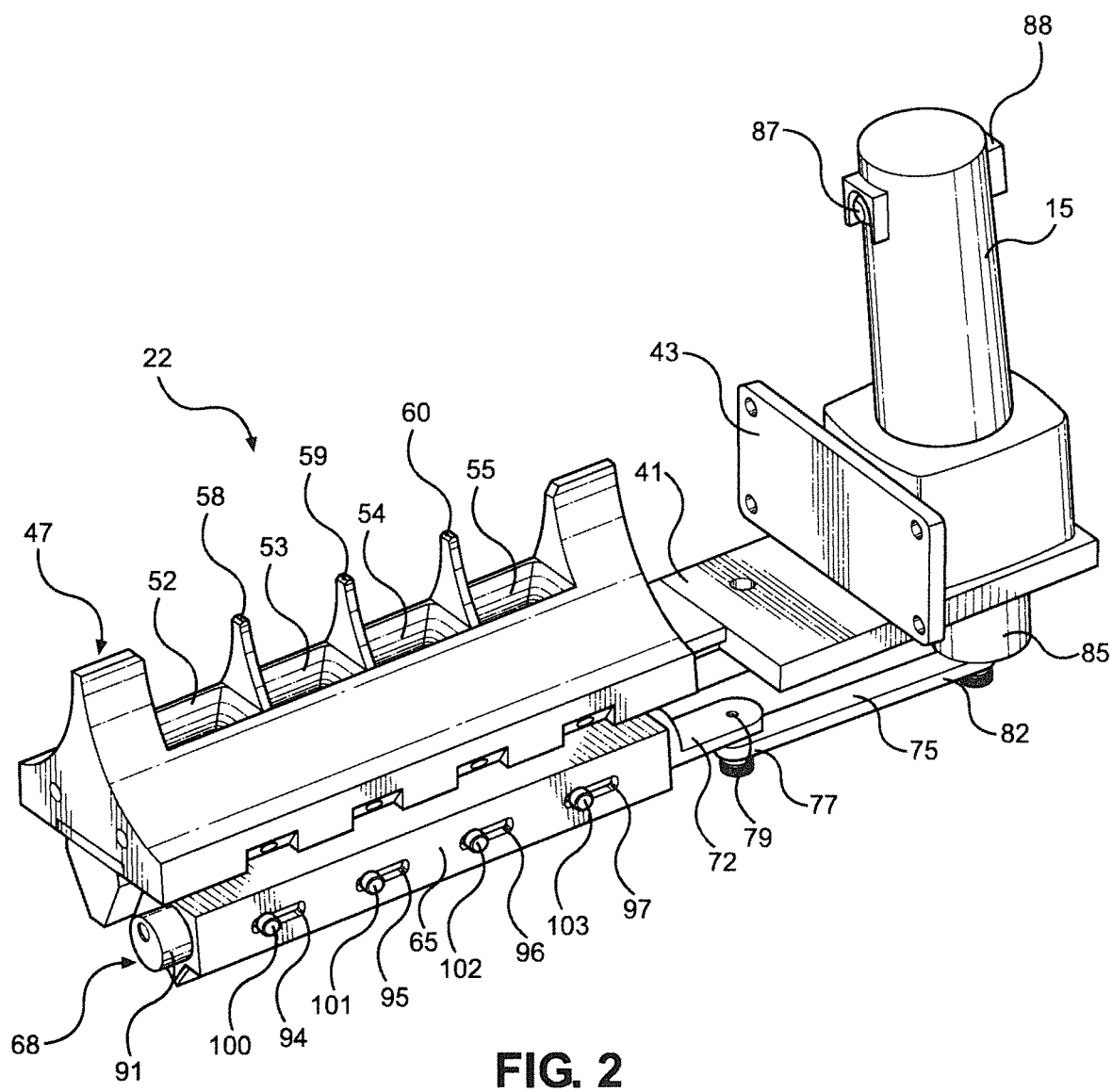
FIG. 2 is an enlarged perspective view of an extrusion unit incorporated in the apparatus of FIG. 1.

FIG. 2 depicts certain internal structure associated with each of extruder 22 and control tower 15. As shown, for mounting and supporting purposes, a base plate 41 and a side plate 43 are provided for an extrusion manifold 47. In the embodiment depicted wherein four rows of snack products 5-8 are being simultaneously produced, extrusion manifold 47 is formed with four supply cavities 52-55 which are separated by dividers 58-60. Extruder 22 also includes an elongated sleeve 65 within which is slidably mounted a cylinder 68 which terminates in an arm 72. A lever 75 includes a first end 77 which is pinned to arm 72 with a pin 79, and a second end 82 which is drivingly connected to a motor 85 (preferably electric), the operation of which is controlled through one or more switches 87, 88 provided on control tower 15. With this arrangement, activation of motor 85 causes second end 82 of lever 75 to move in a circular path which, in turn, causes cylinder 68 to reciprocate within sleeve 65. In the position shown, cylinder 68 is nearly fully extended such that a terminal end 91 of cylinder 68 is shown projecting from sleeve 65. As also shown, sleeve 65 is provided with a series of slots 94-97. Arranged at each slot 94-97 is a respective manual adjustment knob 100-103. The purpose of adjustment knobs 100-103 will become more fully apparent below but, at this point, it should just be noted that adjustment knobs 100-103 are attached to and reciprocate in unison with cylinder 68.

Figure 3:
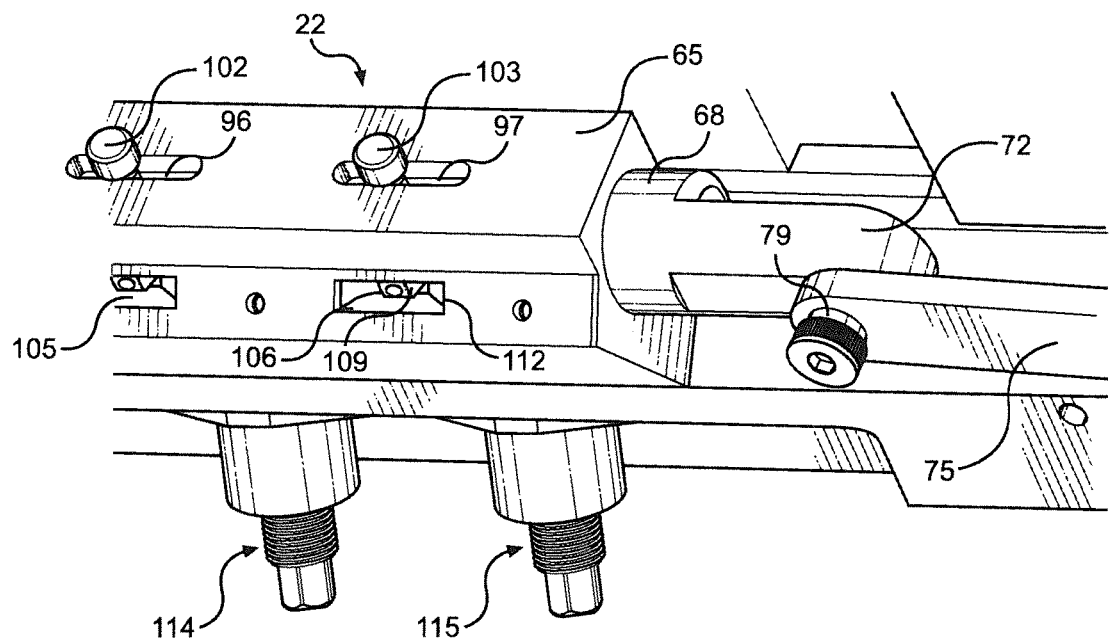
FIG. 3 is an enlarged, perspective view of a portion of the extrusion unit of FIG. 2.

FIG. 3 provides additional details regarding certain structure of extruder 22 discussed above. In addition, this figure illustrates multiple extrusion ports for extruder 22. More specifically, note two extrusion ports indicated at 105 and 106, with extrusion port 105 being in fluid communication with supply cavity 54 and extrusion port 106 being in fluid communication with supply cavity 55. In addition, an extrusion nozzle 109 is provided within each extrusion port 105, 106 and, more specifically, directly adjacent an outlet opening 112 for a respective extrusion port 105, 106. As further detailed below, supply cavities 52-55 are employed to supply primary filling 32 for extrusion through the various extrusion ports, including extrusion ports 105 and 106, while secondary filling 34 is co-extruded through the respective extrusion nozzles 109. A respective flow regulator 114, 115, as detailed more fully below, is also provided for each extrusion port 105, 106. At this point, it should be recognized that the number of extrusion ports 105, 106, cavities 52-55 and extrusion nozzles 109 can vary in accordance with the invention based on the number of product streams desired. With this in mind, much of the remaining discussion will be directed to providing details of the extrusion structure relied upon to produce a single product stream and it is to be understood that corresponding structure is employed in connection with additional product streams.

Figure 4A:
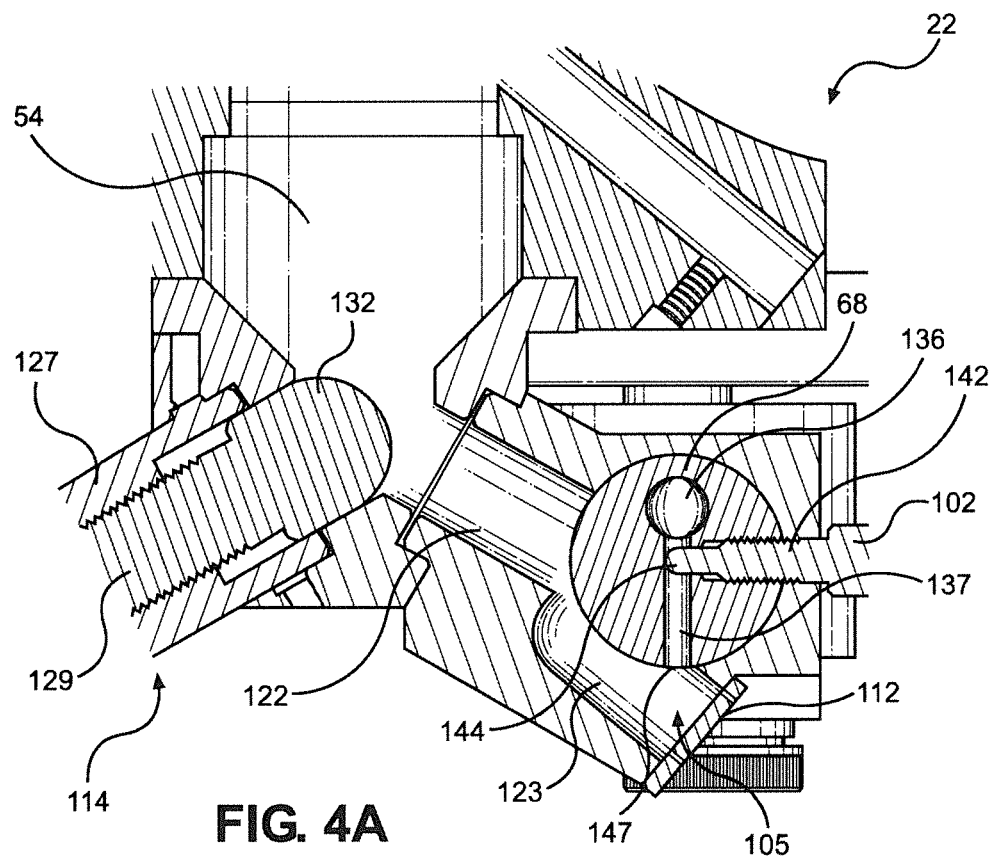
FIG. 4A is a cross-sectional view taken across a portion of the extrusion unit of FIGS. 2 and 3.
Figure 4B:
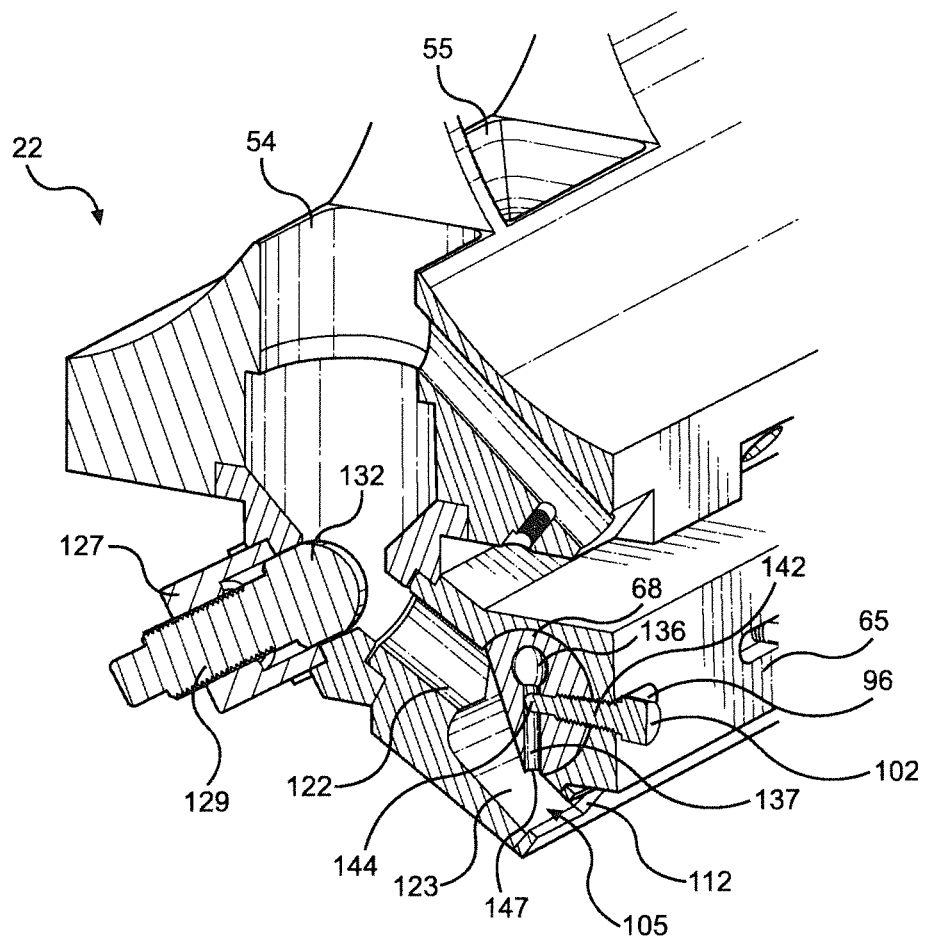
FIG. 4B is a partial cross-sectional view taken across another portion of the extrusion unit.

With particular reference to FIGS. 4A and 4B, the internal configuration of portions of extruder 22 is illustrated. As shown, supply cavity 54 leads to a first extrusion passage 122 and then to a first extrusion sub-passage 123 of extrusion port 105. Flow regulator 114 includes a regulator body 127 and a flow adjustment member 129. In the embodiment depicted, flow adjustment member 129 is threaded to regulator body 127 and includes a rounded head 132 which projects into the flow path to first extrusion passage 122. With this arrangement, it should be readily apparent that the rate of supply of primary filling 32 can be readily adjusted by the shifting of flow adjustment member 129 relative to regulator body 127, with this adjustment being shown to be manual in nature but a powered adjustment is also possible.

Basically positioned at the juncture of first extrusion passage 122 and first extrusion sub-passage 123 is cylinder 68. Within cylinder 68 is formed a second extrusion passage 136 leading to individual second extrusion sub-passages, such as second extrusion sub-passage 137 associated with a respective extrusion nozzle 109 (shown in FIG. 3). As clearly shown in these figures, adjustment knob 102 is connected to a threaded shaft 142 having a head 144 which projects into second extrusion sub-passage 137. In a similar manner to each of flow regulators 114 and 115, adjustment knob 102 can be used to alter a flow rate for secondary filling 34 from extrusion nozzle 109 shown in FIG. 3).

At this point, it should be noted that the positioning of extrusion nozzle 109 (shown in FIG. 3) within extrusion port 105 and relative to outlet opening 112 is important in accordance with the invention. That is, to achieve the desired product configuration, secondary filling 34 must be extruded upstream of but close to outlet opening (die port exit) 112. More specifically, extrusion nozzle 109 (shown in FIG. 3) is positioned directly adjacent outlet opening 112 for desired surface positioning in snack products 5-8. By "directly adjacent", it is meant that a die exit port 147 of extrusion nozzle 109 (shown in FIG. 3) must be positioned such that secondary filling 34 is extruded within about ½ inch (approximately 1.25 cm) of outlet opening 112 for the desired co-extrusion profile. That is, it is desired to assure that die exit port 147 is recessed within extrusion port 105 by no more than this distance. In addition, the angle of die exit port 147 is also important in accordance with the invention. Here, an acute angle to a direction of extrusion for primary filling 32 must be assured to establish a tangential flow, particularly to avoid back pressure on primary filling 32 and to obtain a desired smooth product finish. Although the acute angle could be varied while still achieving the required embedding of the secondary filling 34 and the smooth finish product, a preferred embodiment employs an angle of approximately 50 degrees for a die exit port 147 sized at 3/16 inch (approximately 0.5 cm).

Figure 5:
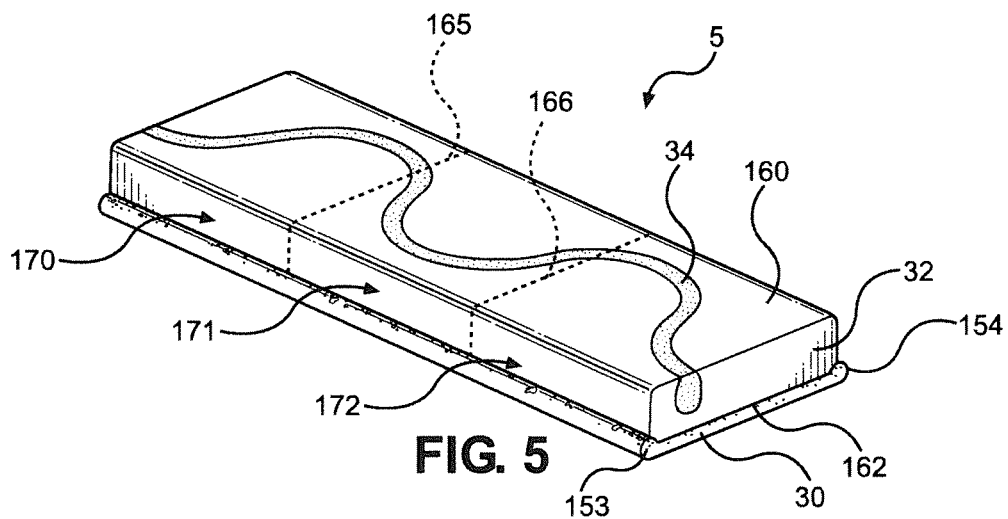
FIG. 5 is a perspective view of an extruded food product produced in accordance with the invention.

FIG. 5 illustrates a representative portion of snack product 5. Here, it can be seen that base 30 is formed with upstanding sidewalls 153 and 154 between which is extruded the primary and secondary fillings 32 and 34. As should be readily apparent, primary filling 32 is non-flowable so as to keep its form and remain between sidewalls 153 and 154. On the other hand, secondary filling 34 can be flowable. In a preferred embodiment, primary filling 32 constitutes a thick cheesecake filling, while secondary filling 34 is a fruit topping. However, other compositions could be employed. For example, primary filling 32 could be constituted by peanut butter. On the other hand, secondary filling 34 could be a thick fruit or caramel based paste, fruit jelly (with or without small particulates), or the like. In addition, base 30 can have different compositions, including being graham or chocolate based. Most important in accordance with the invention is that the co-extrusion arrangement disclosed provides for secondary filling 34 to be embedded in primary filling 32, yet externally exposed and visible. That is, primary filling 32 has a depth established between a top surface 160 and a bottom surface 162. When secondary filling 34 is co-extruded as disclosed, secondary filling 34 is substantially flush with top surface 160 and extends to a point between top surface 160 and bottom surface 162, such as one-half or more of the depth of primary filling 32. More particularly, even though primary filling 32 is non-flowable, i.e., thick, with a modeling clay, marshmallow or Playdough-like consistency so as to have a tendency to keep its shape, the extrusion of secondary filling 34 causes secondary filling 34 to push into primary filling 32. The extrusion pressures for the primary and secondary fillings 32 and 34 are balanced to achieve this result and the co-extrusion through outlet opening 112 assures the smooth finish as depicted in this figure. Exemplary supply pressures in accordance with the invention include 10 psi for a cheesecake-based primary filling 32, 90 psi for a peanut butter-based primary filling 32 and 30 psi for a fruit or caramel-based secondary filling 34. These pressures, as well as the speed of conveyor 25, also affect the overall filling thicknesses. In preferred embodiments, conveyor 25 is operated at between 30-60 ft/min (approximately 9-18 m/min).

As shown in this figure, secondary filling 34 extends within primary filling 32 in an oscillating or sinusoidal, non-linear pattern based on the operation of motor 85 and the corresponding reciprocation of cylinder 68 and each extrusion nozzle 109. Of course, different patterns can be readily produced, such as by altering a stroke length for cylinder 68 or even de-activating motor 85 to produce a linear pattern. Snack product 5 can be cut, such as by laser cutting along cut lines 165 and 166, to establish individual snack bars, such as indicated at 170, 171 and 172, which can be individually wrapped in a package for sale. Certainly, the actual size of each snack bar 170-172 can vary in accordance with the invention. However, a preferred embodiment provides for: an overall width in the order of 2-3 inches (approximately 5-7.5 cm); an overall height in the order of ½ to ¾ inches (approximately 1.25-2 cm); and a height or thickness for base 30 in the order of 0.25 inches (approximately 0.6 cm). In addition, the length of each snack bar 170-172 can vary, but is preferably at least as long as the overall width. In any case, it should be understood that these disclosed embodiments are illustrative and not restrictive.

Figure 6A:
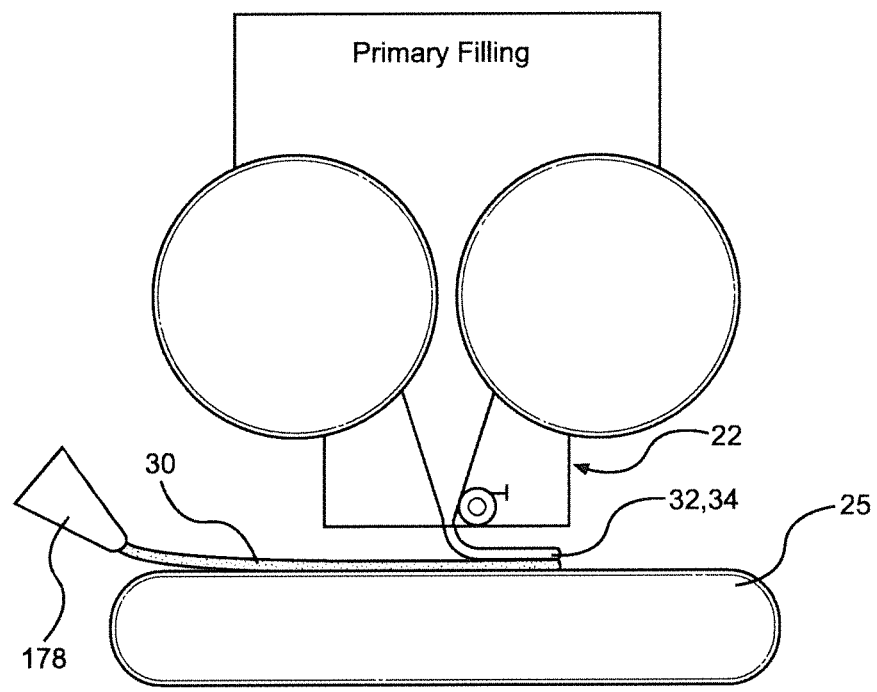
FIG. 6A schematically illustrates an overall extrusion arrangement in accordance with one embodiment of the invention.
Figure 6B:
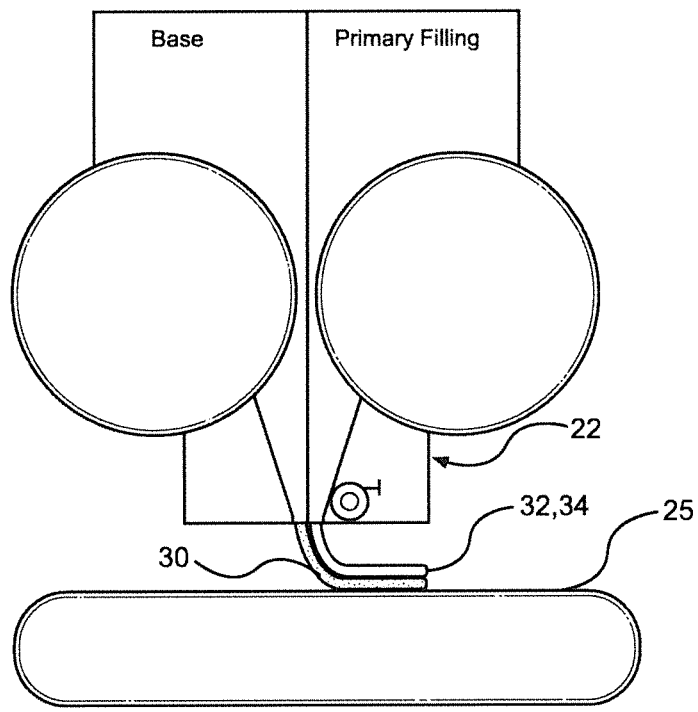
FIG. 6B schematically illustrates an overall extrusion arrangement in accordance with another embodiment of the invention.

As indicated above, the compositions for base 30, primary filling 32 and secondary filling 34 can vary in accordance with the invention. In addition, the manner in which base 30 is produced/supplied can also vary. For instance, with reference to the schematics of FIGS. 6A and 6B, base 30 can be delivered onto conveyor 25 with a separate extruder 178 arranged upstream of extruder 22 as illustrated in FIG. 6A, or further co-extruded with primary and secondary fillings 32 and 34 as represented in FIG. 6B. In any case, although the invention can be employed to make other products, and various changes can be made without departing from the spirit of the invention, as described above, the method and apparatus of the invention can be particularly employed in forming a snack bar with a base establishing a crust and an extruded filling provided on the crust, with the filling including a primary filling constituted by a non-flowable material and a secondary filling, wherein the secondary filling is embedded in, yet externally exposed from, the primary filling.

The invention claimed is:

1. A method of making snack bars comprising:
   extruding a primary filling, constituted by a non-flowable material, from an extrusion port and onto a base;
   co-extruding a secondary filling with the primary filling, wherein the secondary filling is extruded from an extrusion nozzle within the extrusion port and pushed into the primary filling within the extrusion port as to be embedded in, yet externally exposed from, the primary filling on the base; and
   cutting the primary filling, secondary filling and base into individual snack bars, the method further comprising extruding the primary filling to have a smooth top surface, and co-extruding said secondary filling to be substantially flush with and visible from the top surface;
   extruding the primary filling to a depth established between the smooth top surface and a bottom surface;
   co-extruding the secondary filling so as to push the secondary filling into the primary filling to approximately half of the depth; and
   pushing the secondary filling into the primary filling within the extrusion port so as to deform the primary filling.

2. The method of claim 1, further comprising: co-extruding the secondary filling from the extrusion nozzle, wherein the extrusion nozzle is located upstream of, but directly adjacent, an outlet opening of the extrusion port.

3. The method of claim 2, wherein the secondary filling is co-extruded within the primary filling in a repeating pattern.

4. The method of claim 3, further comprising: oscillating the extrusion nozzle during extruding of the primary and secondary fillings to produce the repeating pattern.

5. The method of claim 4, wherein the repeating pattern is non-linear.

6. The method of claim 5, wherein the repeating pattern is sinusoidal.

7. The method of claim 1, wherein the secondary filling is extruded from the extrusion nozzle which is at an acute angle to a direction of extrusion of the primary filling.

8. The method of claim 2, further comprising: oscillating the extrusion nozzle relative to the extrusion port.

9. The method of claim 8, further comprising: controlling a flow of the secondary filling with a regulator, said regulator being oscillated in unison with the extrusion nozzle.

10. The method of claim 1, wherein the base is established as a graham cracker or chocolate base.

11. The method of claim 1, wherein the primary filling is cheesecake.

12. The method of claim 11, wherein the secondary filling is a fruit filling.

13. The method of claim 2, further comprising: co-extruding the secondary filling within the extrusion port within about one-half inch of the outlet opening.

* * * * *